(12) United States Patent
Vyas et al.

(10) Patent No.: US 8,115,334 B2
(45) Date of Patent: Feb. 14, 2012

(54) ELECTRICALLY DRIVEN POWER TAKE-OFF SYSTEM AND METHOD OF MANUFACTURING SAME

(75) Inventors: Parag Vyas, Munich (DE); Robert Dean King, Schenectady, NY (US); Mark R. Lynass, Munich (DE)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 12/372,880

(22) Filed: Feb. 18, 2009

(65) Prior Publication Data

US 2010/0206100 A1 Aug. 19, 2010

(51) Int. Cl.
B60L 1/00 (2006.01)
B60L 3/00 (2006.01)
H02G 3/00 (2006.01)
(52) U.S. Cl. .................................. 307/10.1
(58) Field of Classification Search ............. 307/9.1, 307/10.1; 180/53.5, 53.6, 65.21
See application file for complete search history.

(56) References Cited

U.S. PATENT DOCUMENTS

| | | | |
|---|---|---|---|
| 5,373,195 A | | 12/1994 | De Doncker et al. |
| 6,962,050 B2 * | | 11/2005 | Hiraki et al. ............ 60/414 |
| 2005/0109550 A1 * | | 5/2005 | Buglione et al. ......... 180/65.2 |
| 2007/0103002 A1 * | | 5/2007 | Chiao et al. ............ 307/10.1 |
| 2009/0018716 A1 * | | 1/2009 | Ambrosio ............... 701/22 |
| 2009/0195067 A1 * | | 8/2009 | Ichikawa et al. ........ 307/9.1 |

OTHER PUBLICATIONS

Eaton, Hybrid Power, Medium-Duty Utility,Telecom and Municipal Applications, Roadranger, 2008, www.roadranger.com.

* cited by examiner

*Primary Examiner* — Jared Fureman
*Assistant Examiner* — Carlos Amaya
(74) *Attorney, Agent, or Firm* — Ziolkowski Patent Solutions Group, SC; Jean K. Testa

(57) ABSTRACT

A system and method for operating power take-off (PTO) systems aboard hybrid and electric systems and vehicles is disclosed. The PTO system includes an energy storage device configured to supply electrical power and at least one electrical drive system electrically connected to the energy storage device to receive the electrical power, with each of the at least one electrical drive systems configured to convert the electrical power to a desired mechanical power. The PTO system also includes at least one PTO shaft mechanically connected to each of the at least one electrical drive systems that is driven by the mechanical power to generate a mechanical output, with the mechanical output of each of the at least one PTO shafts being independently controllable from the mechanical output of other PTO shafts.

26 Claims, 7 Drawing Sheets

ELECTRICALLY DRIVEN POWER TAKE-OFF SYSTEM AND METHOD OF MANUFACTURING SAME

BACKGROUND OF THE INVENTION

The invention relates generally to hybrid and electric vehicles, and more specifically to systems and methods for operating power take-off systems aboard hybrid and electric vehicles.

Purely electric vehicles typically use stored electrical energy to power an electric motor, which propels the vehicle. Hybrid electric vehicles combine an internal combustion engine and an electric motor that is typically powered by one or more electrical energy storage devices. Such a combination may increase overall fuel efficiency by enabling the combustion engine and the electric motor to each operate in respective ranges of increased efficiency. It may be more efficient to use electric motors during startup, and use combustion engines primarily during sustained periods of constant engine operation. For example in a hybrid vehicle, having an electric motor to boost initial acceleration permits the use of a smaller and more fuel efficient combustion engine.

Some large conventionally-powered vehicles, such as trucks, tractors, and even marine craft, use power take-off (PTO) systems to provide power to an attached or separate machine. Typically, the PTO device draws power from the vehicle's combustion engine via a PTO shaft. Common applications for PTO systems include running water pumps on fire engines and marine vessels, running hydraulic pumps on trucks or other machinery, and running threshers and harvesters on agricultural vehicles. Other applications include raising/lowering a dump truck bed, operating the compactor on a garbage truck, operating a winch on a tow truck, or driving an electric generator.

Typically, mid and rear PTO shafts are provided on agricultural vehicles. Common PTO standards call for shaft rotation speeds of 540 or 1000 rpm, which is typically achieved by the mechanical coupling of the PTO shaft to the internal combustion engine through a clutch and gearbox arrangement. Normally, the engine must run at a fixed speed to provide the correct PTO shaft speed, which may result in reduced engine efficiency at partial load operation, or may limit the maximum torque or power that can be supplied by the PTO system. Further, running the engine at a speed that provides for the correct PTO shaft speed may constrain the ground speed of the vehicle. Additionally, mechanically coupling the PTO shaft to the engine via a clutch and gearbox arrangement may limit the number of locations where the PTO system can be employed.

It would therefore be desirable to design a PTO system configured to recapture energy from the PTO shaft during braking, wherein the engine speed is independent of the PTO shaft speed, and wherein the possible locations for placement of the PTO shaft is not limited by engine location as in some conventional vehicles.

BRIEF DESCRIPTION OF THE INVENTION

According to an aspect of the invention, a power take-off (PTO) system includes an energy storage device configured to supply electrical power and at least one electrical drive system electrically connected to the energy storage device to receive the electrical power, with each of the at least one electrical drive systems configured to convert the electrical power to a desired mechanical power. The PTO system also includes at least one PTO shaft mechanically connected to each of the at least one electrical drive systems that is driven by the mechanical power to generate a mechanical output, with the mechanical output of each of the at least one PTO shafts being independently controllable from the mechanical output of other PTO shafts.

In accordance with another aspect of the invention, a vehicle-based power take-off (PTO) device includes a DC bus, an energy storage unit connected to the DC bus and configured to supply DC power thereto, and a DC-to-AC converter connected to the DC bus and configured to invert the DC power to a controlled AC power. The vehicle-based PTO device also includes an electrical drive system electrically coupled to the DC-to-AC converter to receive the controlled AC power and convert the controlled AC power into a mechanical power and a PTO shaft mechanically coupled to the electrical drive system and driven by the controlled mechanical power.

According to yet another aspect of the invention, a method for manufacturing a power take-off (PTO) system includes the steps of providing a power system to supply a DC power, providing a DC bus coupled to the power system and configured to distribute the DC power, and electrically coupling at least one DC-to-AC converter to the DC bus to receive the DC power and invert the DC power to a controlled AC power. The method also includes the steps of electrically coupling at least one electrical drive system to each of the at least one DC-to-AC converters to generate a mechanical power from the controlled AC power and mechanically coupling a power take-off (PTO) shaft to each of the electrical drive systems such that each PTO shaft is driven by the mechanical power of its associated electrical drive system to produce a PTO shaft mechanical output.

Various other features and advantages will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION

While embodiments of the invention disclosed herein are most often described with respect to power take-off (PTO) systems/devices for use with hybrid-electric vehicles, one skilled in the art will recognize that embodiments of the invention are not limited to hybrid vehicles, but may also be applied to other types of electric industrial machines and hybrid-electric industrial machines that employ an energy storage device in combination with an internal combustion engine. Thus, the term vehicle as used hereinafter is understood to encompass other types of electric and hybrid-electric industrial machines that provide power by way of PTO system/device.

Figure 1:
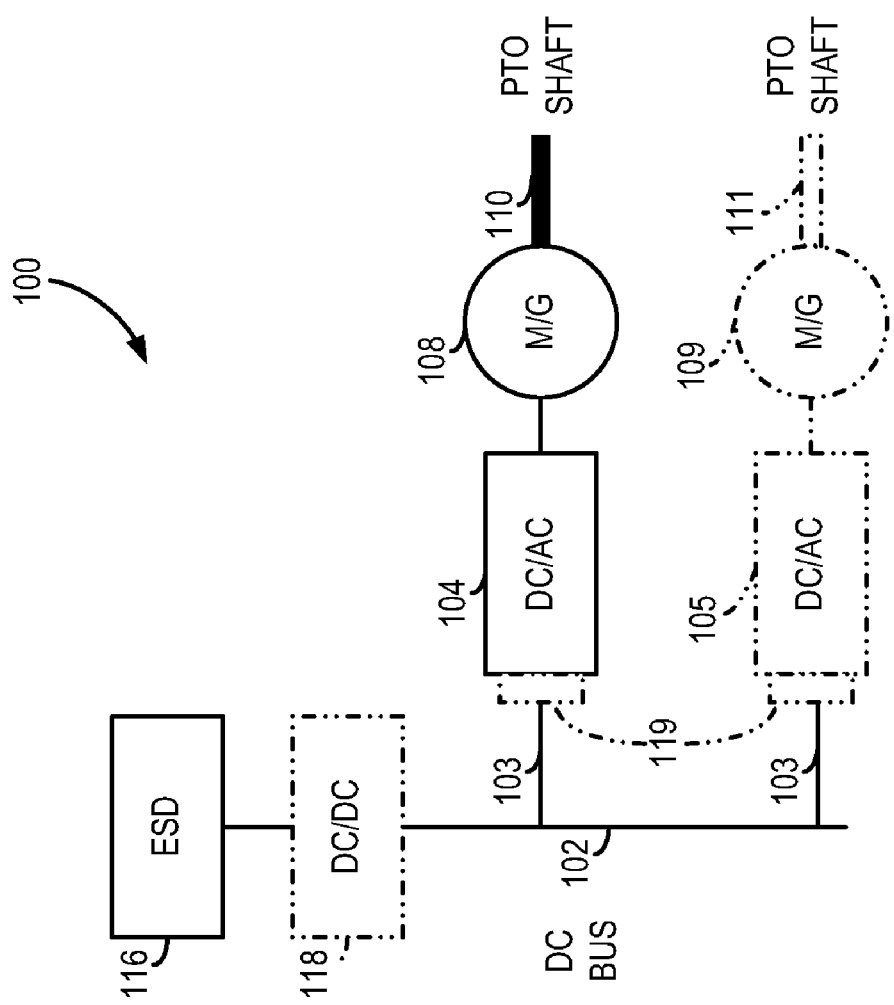
FIG. 1 is a block diagram of an electric power take-off system according to an embodiment of the invention.

FIG. 1 illustrates an embodiment of a power take-off (PTO) system or device 100 that provides auxiliary power to equipment by way of one or more PTO shafts. The PTO system 100 includes a DC bus 102 having distribution branches 103 that electrically couple components of the PTO device 100. A first inverter 104 (i.e., DC-to-AC converter) is coupled to DC bus 102. An electrical drive system 108 is coupled between first inverter 104 and a PTO shaft 110. As shown in FIG. 1, according to an embodiment of the invention, electrical drive system 108 is configured as an electric motor/generator combination that acts to drive the PTO shaft 110, as well as recapture energy therefrom during a slowing (i.e., braking) of the PTO shaft or during operation at or near constant speed or overhauling loads, as is explained in greater detail below. Alternatively, electrical drive system 108 could be formed simply as an electric motor for driving the PTO shaft 110. An energy storage device 116 is also included in PTO system 100 and, according to an exemplary embodiment, is electrically coupled to a DC-to-DC voltage converter 118 (shown in phantom), which is further coupled to DC bus 102. Alternatively, it is also recognized that energy storage device 116 could be directly coupled to the DC bus 102, without inclusion of DC-to-DC voltage converter 118. According to embodiments of the invention, energy storage device 116 may be one of a battery, a fuel cell, and an ultracapacitor, or other suitable battery arrangements for providing power in an electric vehicle. DC-to-DC voltage converter 118 may be a bi-directional buck/boost converter or a conventional (unidirectional) boost converter.

Alternate embodiments of the PTO device 100 may include a second inverter 105 (shown in phantom) coupled to DC bus 102. In the alternate embodiment, a second electrical drive system (i.e. electric motor/generator combination) 109 (shown in phantom) is coupled between second inverter 105 and a second PTO shaft 111 (shown in phantom). Operating PTO shafts 110, 111 electrically allows for the installation of controls 119 configured to cause inverters 104, 105 to control power transmitted to the electrical drive systems 108, 109 to control a mechanical output of PTO shafts 110, 111 and/or shut off power to PTO shafts 110, 111 upon detection of a fault condition, or upon violation of a safety protocol.

In operation, energy storage device 116 supplies DC electrical power to DC bus 102 either directly or via DC-to-DC voltage converter 118. DC-to-DC voltage converter 118 is configured to condition (e.g., boost) the voltage output from energy storage device 116 to a level suitable for driving electrical drive system 108. Inverter 104 converts the DC voltage on DC bus 102 into a controlled AC power that drives electrical drive system 108. Electrical drive system 108 produces a mechanical power that rotates/drives PTO shaft 110, which is configured to transfer a mechanical output to a machine/equipment (not shown) coupled to the PTO shaft 110. Second inverter 105 similarly provides an AC power that drives electrical drive system 109 and, therefore, second PTO shaft 111. The rotational speed and direction of PTO shafts 110, 111 may be independently controlled by independently controlling the frequency of the AC signal output by inverters 104, 105, respectively. As a result, second PTO shaft 111 can operate at rotational speeds and rotational directions different from those of PTO shaft 110. Further, one PTO shaft may be running while the other PTO shaft is idle.

As set forth above, according to an exemplary embodiment of the invention, electrical drive system 108 can be formed as a electric motor/generator according to an embodiment of the invention, such that energy from PTO shaft 110 can be recaptured during a slowdown or "braking" thereof. During braking operations, electric motor/generator 108 operates in generator mode and generates AC electrical power. The AC power is transferred to inverter 104 that, according to the exemplary embodiment, is further configured as an AC-to-DC converter, such that the AC signal from electric motor/generator 108 is converted into a DC signal that can be used, for example, to recharge energy storage device 116. Recharging of energy storage device 116 is possible when DC-to-DC voltage converter 118 is a bi-directional buck/boost converter. According to embodiments of the invention, the DC signal generated by the slowdown/braking of PTO shaft 110 can also be redirected to inverter 105, for example, to provide power to driving the other PTO shaft 111. In addition to capturing energy during braking, energy from PTO shaft 110 can also be recaptured when cyclical loads are coupled thereto. A cyclical load is configured to be driven by a PTO shaft with an oscillating load torque. During those periods when the rotational speed of the shaft is decreasing, energy can be recaptured in the same manner used in the regenerative braking process.

Figure 2:
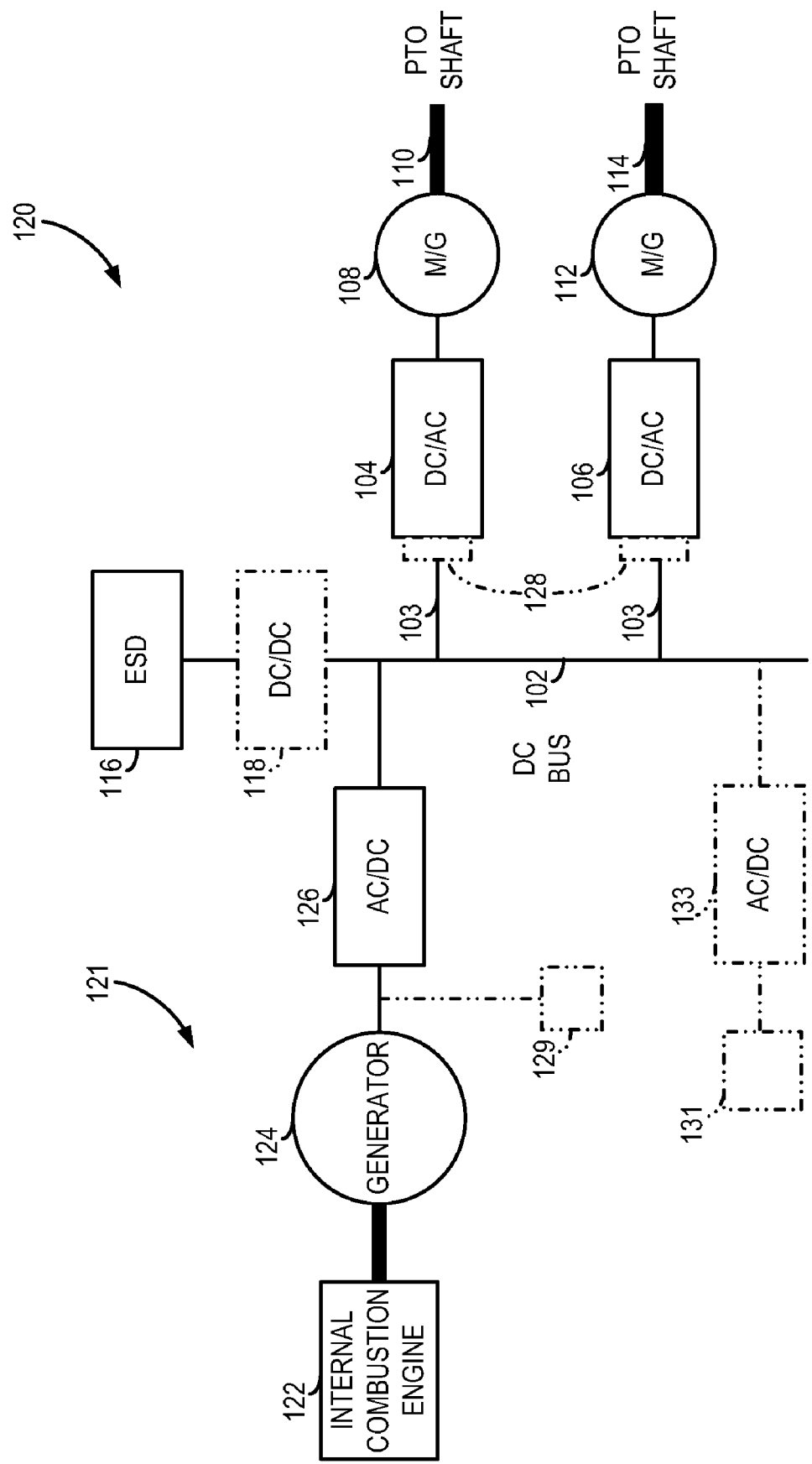
FIG. 2 is a block diagram of a hybrid electric power take-off system according to an embodiment of the invention.

FIG. 2 illustrates an embodiment of a PTO system 120 for use on a hybrid-electric vehicle or industrial machine. PTO system 120 includes a distribution or DC bus 102 having a plurality of distribution branches 103 therein. Electrically coupled to distribution branches 103 of DC bus 102 are a first inverter 104 and a second inverter 106 (i.e., DC-to-AC converters). First inverter 104 is also electrically coupled to a first electrical drive system 108, which is, in turn, mechanically coupled to PTO shaft 110. Shaft 110 is configured to drive machinery that might be found on agricultural vehicles, dump trucks, tow trucks, fire engines or marine vehicles. Second inverter 106 is electrically coupled to a second electrical drive system 112, which is mechanically coupled to a drive shaft 114, which, in some embodiments of the invention, may be configured to propel a vehicle. Also included in PTO system 120 is an energy storage device 116 that is coupled to a DC-to-DC voltage converter 118 (shown in phantom), which in turn is coupled to DC bus 102. Alternatively, it is also recognized that energy storage device 116 could be directly coupled to the DC bus 102, without inclusion of DC-to-DC voltage converter 118. In an embodiment of the invention, DC-to-DC voltage converter 118 is a bi-directional buck/boost converter. In an alternate embodiment, DC-to-DC voltage converter 118 is a conventional (i.e., unidirectional) boost converter. In yet another alternate embodiment, DC Bus 102 may be direct electrically coupled to the energy storage device 116 without a DC-DC boost converter 118. Energy storage device 116 may be one of a battery, ultracapacitor, and a fuel cell.

As shown in FIG. 2, in an embodiment where PTO system 120 is formed as a hybrid-electric system, an auxiliary power unit (APU) 121 is incorporated into the PTO system 120. According to an exemplary embodiment, APU 121 includes therein an internal combustion engine 122 that provides an engine output in the form of mechanical energy, which is converted into electrical energy by electric generator 124, comprised of rotary or linear components that may be configured as, for example, an induction generator, a permanent magnet generator, a synchronous generator with field excitation, or similar device. Typically, electric generator 124 produces a three-phase AC power, but may produce single-phase or other multi-phase AC power. An AC-to-DC converter 126 converts the AC power from electric generator 124 into a DC power that is output to DC bus 102. Energy storage device 116 also provides electrical power to DC bus 102 directly or through DC-to-DC voltage converter 118 (shown in phantom), which may be configured to step up the DC voltage from energy storage device to a DC voltage suitable for use by first inverter 104 and second inverter 106. In embodiments where the DC-to-DC voltage converter 118 is a bi-directional buck/boost converter, electrical power from DC bus 102 can be used by voltage converter 118 to charge energy storage device 116.

In operation of the PTO system 120, first inverter 104 converts the DC power from DC bus 102 into a controlled AC power, which is converted by electrical drive system 108 into mechanical energy/power suitable for driving PTO shaft 110. Similarly, second inverter 106 converts the DC power from DC bus 102 into AC power, which is converted by electrical drive system 112 into mechanical energy/power suitable for driving drive shaft 114. In an exemplary embodiment, where electrical drive systems 108, 112 are formed as an electric motor/generator combination, energy from PTO shaft 110 and drive shaft 114 can be recaptured during regenerative braking or cycling of the PTO shafts. During regenerative braking of the PTO shaft 110, first electric motor/generator 108 converts mechanical energy from PTO shaft 110 into an AC power. The AC power is typically a three-phase current, but may be single-phase or some other multi-phase current. First inverter 104 is further configured as an AC-to-DC converter that converts the AC signal from first electric motor/generator 108 into a DC signal that is output to DC bus 102 where it can be used to charge energy storage device 116. Similarly, during regenerative braking of drive shaft 114, second electric motor/generator 112 converts mechanical energy from drive shaft 114 into an AC power. Second inverter 106 is further configured as an AC-to-DC converter that converts the AC signal from second electric motor/generator 112 into a DC signal that is output to DC bus 102 where it can be used to charge energy storage device 116.

By de-linking or de-coupling internal combustion engine 122 from PTO shaft 110 and from drive shaft 114, engine 122 can operate at any desired speed regardless of the load placed on PTO shaft 110 or drive shaft 114, such that fuel-efficiency of the engine can be maximized and/or a desired vehicle speed can be achieved without regard to the PTO shaft requirements. When it is efficient to do so, PTO shaft 110 and drive shaft 114 may be operated when internal combustion engine 122 is shut off, resulting in fuel savings and reduced vehicle or machine emissions and reduced audible noise that may be important for operation of PTO system 120 in residential locations.

As shown in FIG. 2, the hybrid-electric PTO system 120 further includes a controller 128 (shown in phantom) configured to control operation of PTO shaft 110 (and/or drive shaft 114). According to an embodiment of the invention, controller 128 is configured to sense either a speed requirement or a torque requirement of the PTO shaft 110, such as by receiving a power request from electrical drive system 108. Based on the speed/torque requirement of the PTO shaft 110, controller 128 acts to control the amount of conditioned AC power generated by inverter 104 and transmitted to electrical drive system 108, such as by controlling the frequency of the AC power signal output by inverter 104. The rotational speed of PTO shaft 110 may thus be controlled independent of operation/output of engine 122.

Because the rotation speed and rotational direction of PTO shaft 110 is independent from engine 122 rotation speed and rotational direction, torque limits may be placed on PTO shaft 110 to limit the mechanical stresses thereon. Further, these torque limits may be adjusted based on the load coupled to PTO shaft 110. As a result, PTO shaft 110 may be able to tolerate higher transient variation in loads than could be tolerated by a PTO shaft mechanically coupled to the engine 122. Additionally, inverter 104 may be caused to supply a signal that causes first electric motor/generator 108 to start rotation of PTO shaft 110 at a predetermined rate. For example, for large loads, it may be desirable to slowly ramp up the rotational speed of PTO shaft 110 to reduce the mechanical stresses thereon.

Controller 128 is further configured to cause first and second inverters 104, 106 to shut off power to the PTO shaft 110 and/or drive shaft 114 under certain conditions. Controller 128 may be configured to detect certain failure conditions or to detect violations of safety protocols. When such conditions or violations are detected, controller 128 may cause one or both of first and second inverters 104, 106 to discontinue transmission of power to one or both of first and second electric motor/generators 108, 112 to stop rotation of PTO shaft 110 and/or drive shaft 114. In an alternate embodiment, controller 128 may cause one or both of the first and second inverters 104, 106 to output near zero electrical frequency to hold speed of PTO shaft 110 and or drive shaft 114 at zero speed for certain applications, including industrial cranes with an overhauling load or holding an industrial machine on a grade.

In addition to allowing for operation of engine 122 independent of the load (i.e., speed/torque requirement) placed on PTO shaft 110, de-linking PTO shaft 110 from combustion engine 122 also provides greater flexibility in the placement of the PTO shaft 110. As PTO shaft 110 draws power from DC bus 102 rather than directly from combustion engine 122 as in conventional internal combustion engine vehicles, PTO shaft 110 placement is not constrained by combustion engine 122 location. Rather PTO shaft 110 may be disposed in a variety of locations having access to DC bus 102.

As further shown in phantom in FIG. 2, according to an embodiment of the invention, an electrical power receptacle 129 may be attached to generator 124 to receive AC power therefrom. The electrical power receptacle 129 is configured to connect to a plug of an external device/load (not shown), so as to provide grid quality AC power thereto from PTO system 120. In such an embodiment, combustion engine 122 would run at a fixed speed and generator 124 would be configured to have a voltage rating equivalent to typical utility electrical outlets. According to another alternative embodiment, and as shown in phantom in FIG. 2, a DC-to-AC converter 133 and electrical power receptacle 131 are provided and configured to connect to a plug of an external device/load (not shown), so as to provide grid quality AC power thereto from PTO system 120. The DC-to-AC converter 133 and electrical power receptacle 131 are attached directly to the DC bus 102, such that the speed of combustion engine 122 can be decoupled from the generation of the grid quality AC power and such that the generator 124 can be optimized for the PTO system 120 rather than for matching the voltage rating of utility supplies. Alternatively, grid quality AC power may be supplied to external device/load (not shown) through electrical power receptacle 131 using energy supplied by the energy storage device 116 even when the internal combustion engine 122 and generator 124 are shut off.

Figure 3:
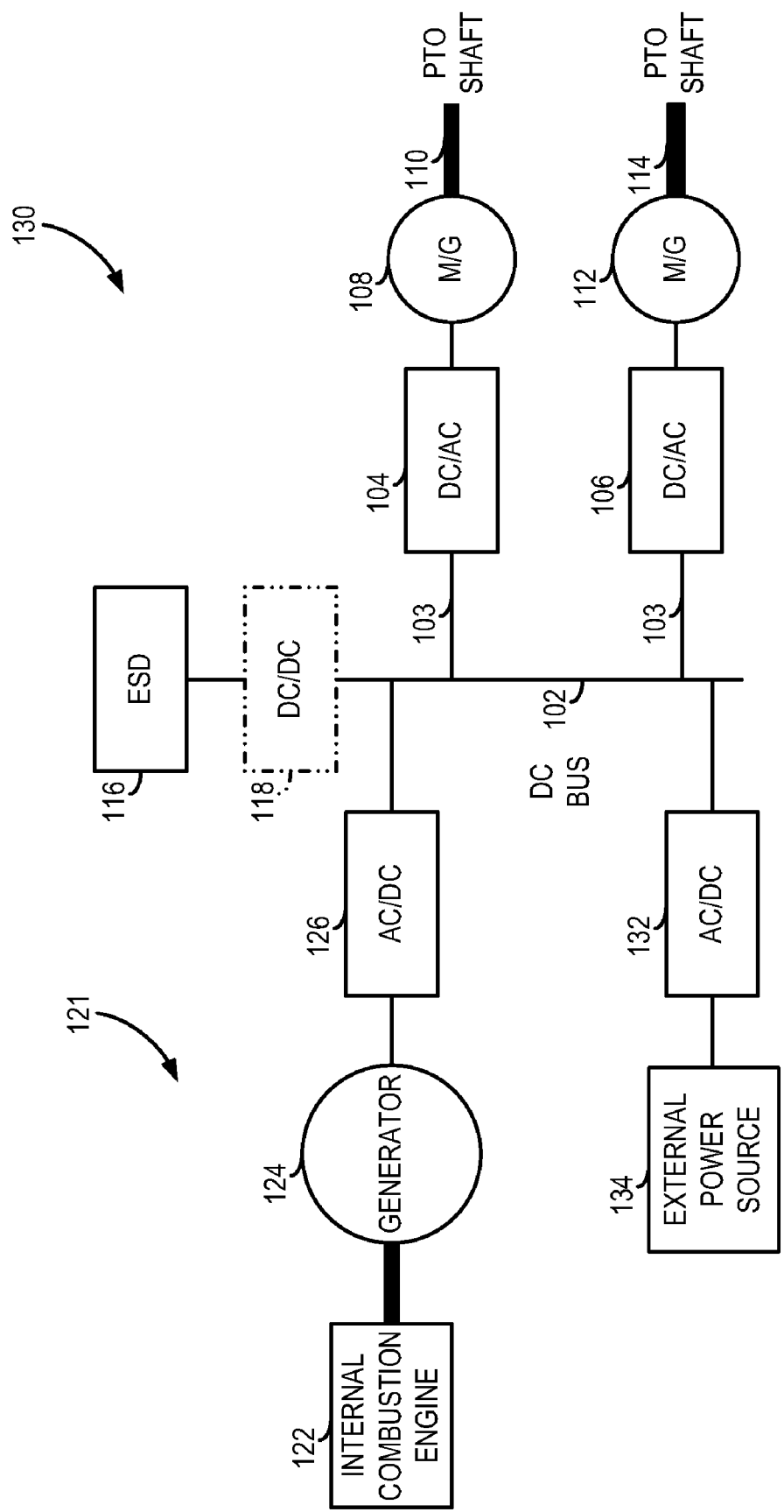
FIG. 3 is a block diagram of a hybrid electric power take-off system according to another embodiment of the invention.

Referring now to FIG. 3, a PTO system 130 for use on a hybrid-electric vehicle is shown, according to an embodiment of the invention. PTO system 130 is similar to system 120 of FIG. 2; however, PTO system 130 also includes an AC-to-DC converter 132 coupled to DC bus 102 and configured to receive electrical power from an external power source 134, such as a utility electrical grid or a portable electric generator.

In operation, external power source 134 supplies an AC power signal to AC-to-DC converter 132, though, in an alternate embodiment, an external DC power source could be used. The AC power signal is converted into a DC signal, which is output to DC bus 102 by AC-to-DC converter 132. Power from external power source 134 may be used to charge energy storage device 116, or to power PTO shaft 110 directly. Power from external power source 134 may replace power that would otherwise be supplied by internal combustion engine 122. In such a case, combustion engine 122 may be turned off while PTO system 130 is connected to external power source 134. This embodiment allows for operation of PTO shafts 110 and/or 114 with reduced fuel consumption by use of external power source 134. External power source 134 can be sized to meet the power requirements of PTO loads instead of internal combustion engine 122 and generator 124 that may be sized to meet vehicle or other larger loads.

Figure 4:
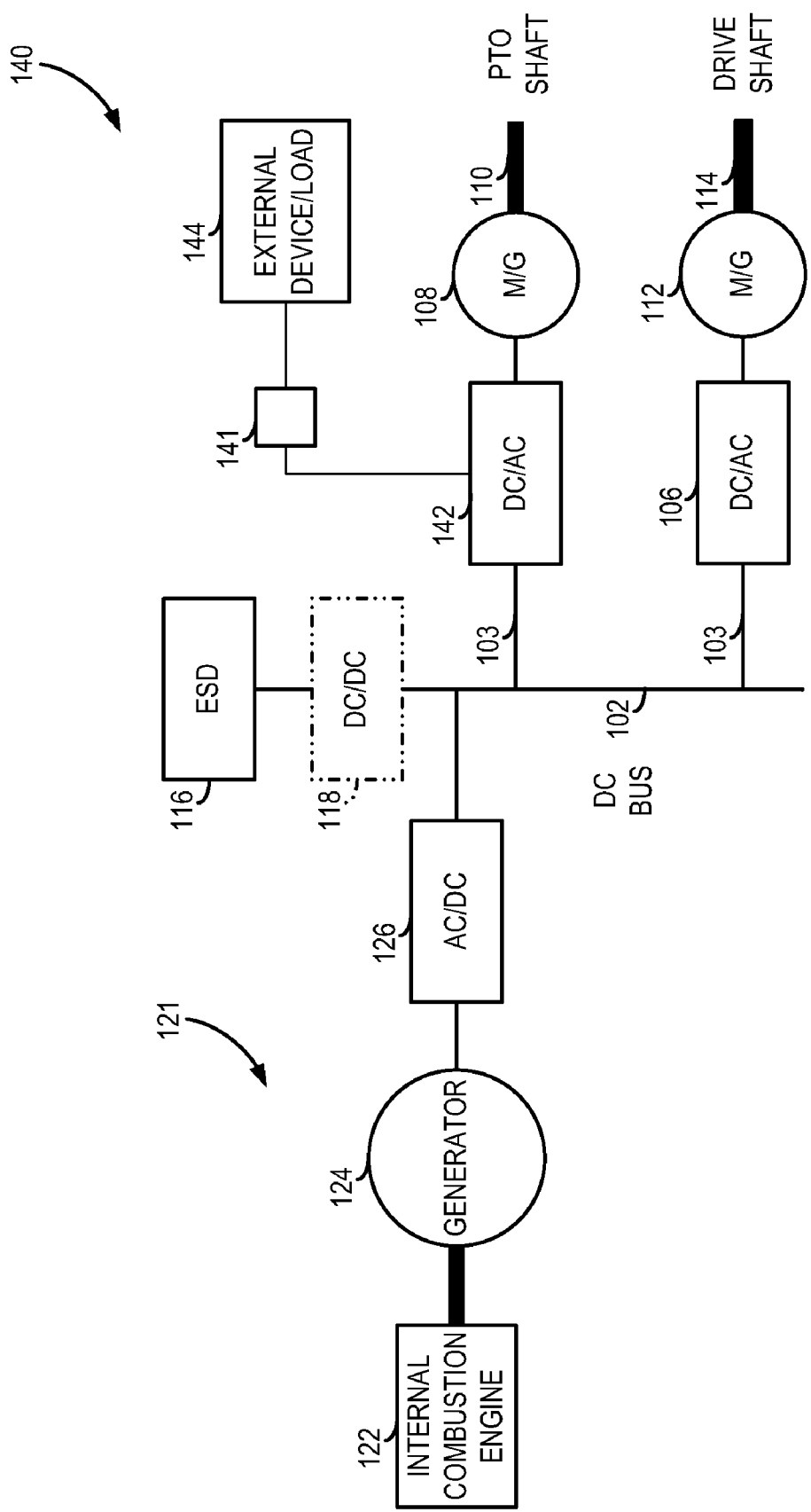
FIG. 4 is a block diagram of a hybrid electric power take-off system according to another embodiment of the invention.

FIG. 4 illustrates an embodiment of a PTO system 140 for use on a hybrid-electric vehicle. PTO system 140 is similar to the hybrid-electric arrangement of system 120 of FIG. 2, but additionally includes therein an electrical power receptacle 141 that receives AC power from an inverter 142 (i.e., DC-to-AC converter) by way of DC bus 102 and energy storage device 116 and/or APU 121. The electrical power receptacle 129 is configured to connect to a plug of an external device/load 144, so as to provide grid quality AC power thereto from PTO system 120.

Figure 5:
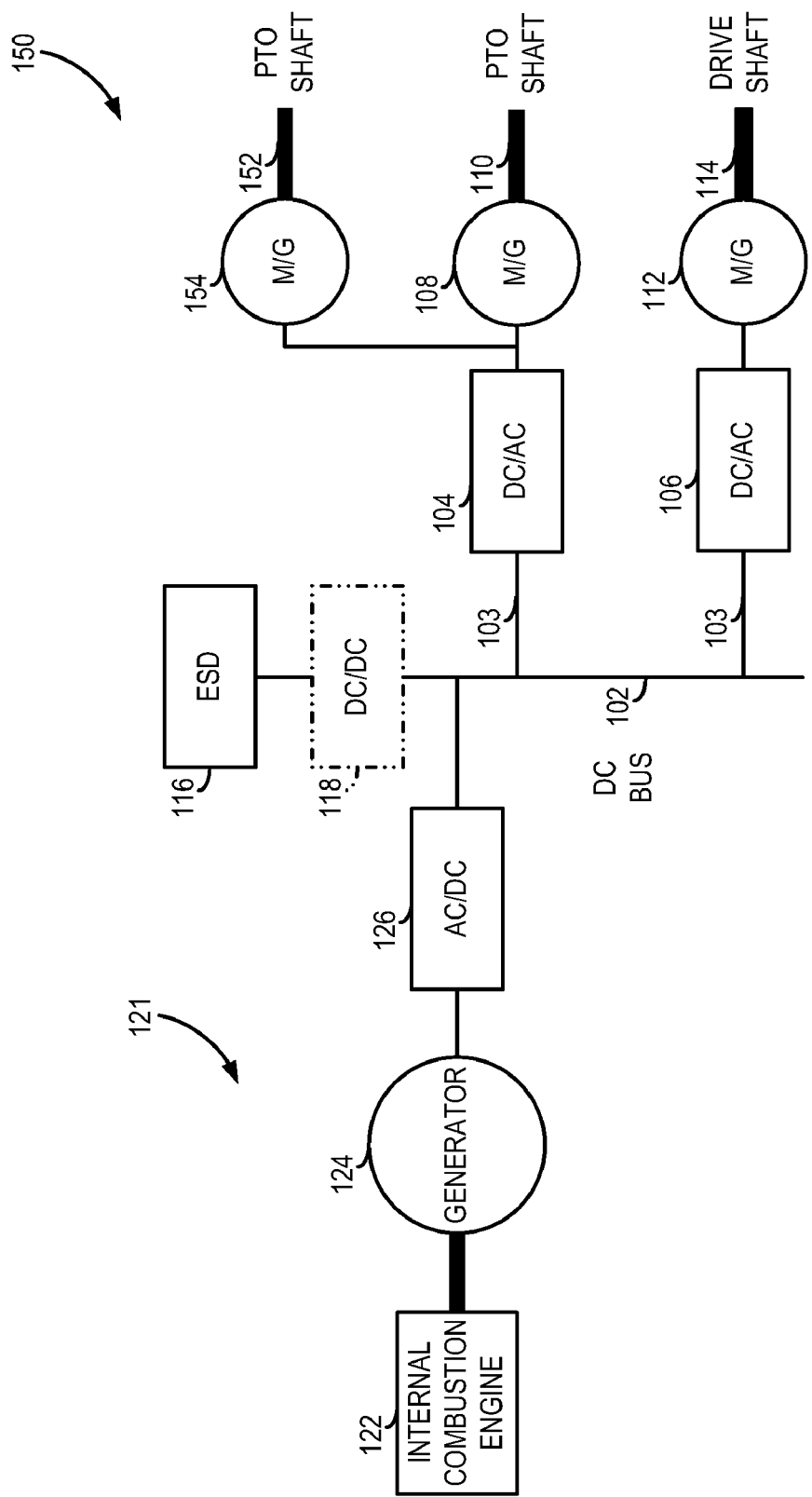
FIG. 5 is a block diagram of a hybrid electric power take-off system according to another embodiment of the invention.

Referring now to FIG. 5, another embodiment of a PTO system 150 for use on a hybrid-electric vehicle is illustrated. PTO system 150 is similar to the hybrid-electric arrangement of system 120 of FIG. 2; however, PTO system 150 includes an additional PTO shaft 152 coupled to an electrical drive system 154, which is, in turn, coupled to a first inverter 104. In operation, first inverter 104 provides AC power to both electrical drive system 108 and electrical drive system 154 to drive PTO shaft 110 and PTO shaft 152, respectively. Because PTO shafts 110, 152 are powered by the same inverter 104, the shafts 110, 152 run at approximately the same speed for electrical drive systems 154 and 108 that use electrical machines (motor/generator) with the same number of pole configurations. Thus, the embodiment of FIG. 5 illustrates that multiple PTO shafts 110, 152 may be driven by electrical drive systems 108, 154 that receive AC power provided from a single inverter 104.

Figure 6:
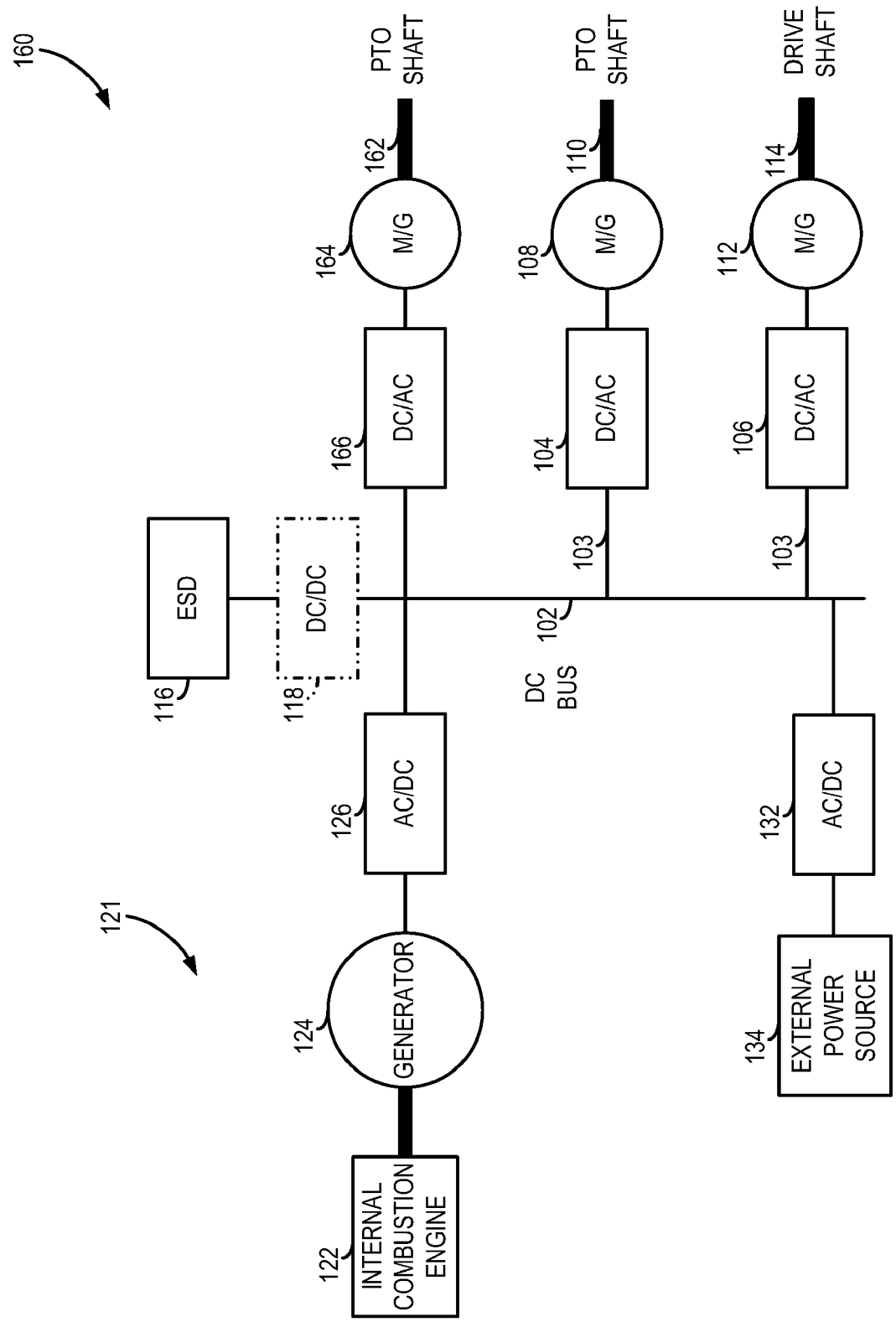
FIG. 6 is a block diagram of a hybrid electric power take-off system according to another embodiment of the invention.

FIG. 6 illustrates another embodiment of a PTO system 160 for use on a hybrid electric vehicle. PTO system 160 is similar to the hybrid-electric arrangement of system 130 of FIG. 2; however, PTO system 160 includes an additional PTO shaft 162 coupled to an electrical drive system 164. Electrical drive system 164 is coupled to an inverter 166, which is in turn coupled to DC bus 102.

In operation, first and second PTO shafts 110, 162 and drive shaft 114 draw power from DC bus 102 via inverters 104, 166, 106, respectively. When electrical drive systems 108, 164, 112 are configured as electric motor/generator combinations, it is recognized that both PTO shafts 110, 162 and drive shaft 114 of PTO system 160 are configured to supply power to DC bus 102 through respective motor generators 108, 164, 112 and respective inverters 104, 166, 106 during regenerative braking and/or slowing of the PTO shafts, and/or maintaining speed on PTO shafts with overhauling loads. Each of the shafts may be powered by external power source 134, energy storage device 116, and/or by internal combustion engine 122 (through electric generator 124 and AC-to-DC voltage converter 126). Because PTO shafts 110, 162 are driven by different inverters 104, 166, the shafts can be operated independently. For example, shafts 110, 162 can drive their respective loads at different rotational speeds, or different rotational directions, or one shaft can be idle while the other shaft is rotating. Such independent operation allows for one running PTO shaft to be supplied directly with energy recaptured during regenerative braking of the other PTO shaft. Energy supplied directly from one PTO shaft to another PTO shaft avoids the losses inherent in moving the recaptured energy into storage device 116, and then moving the stored energy from storage device 116 to one of PTO shafts 110, 162. Alternatively, energy supplied directly from one PTO shaft to another PTO shaft avoids the losses inherent in moving the recaptured energy into storage device 116 through DC-to-DC voltage converter 118 (shown in phantom) and then moving the stored energy from storage device 116 through DC-to-DC voltage converter 118 (shown in phantom) to one of PTO shafts 110, 162.

Figure 7:
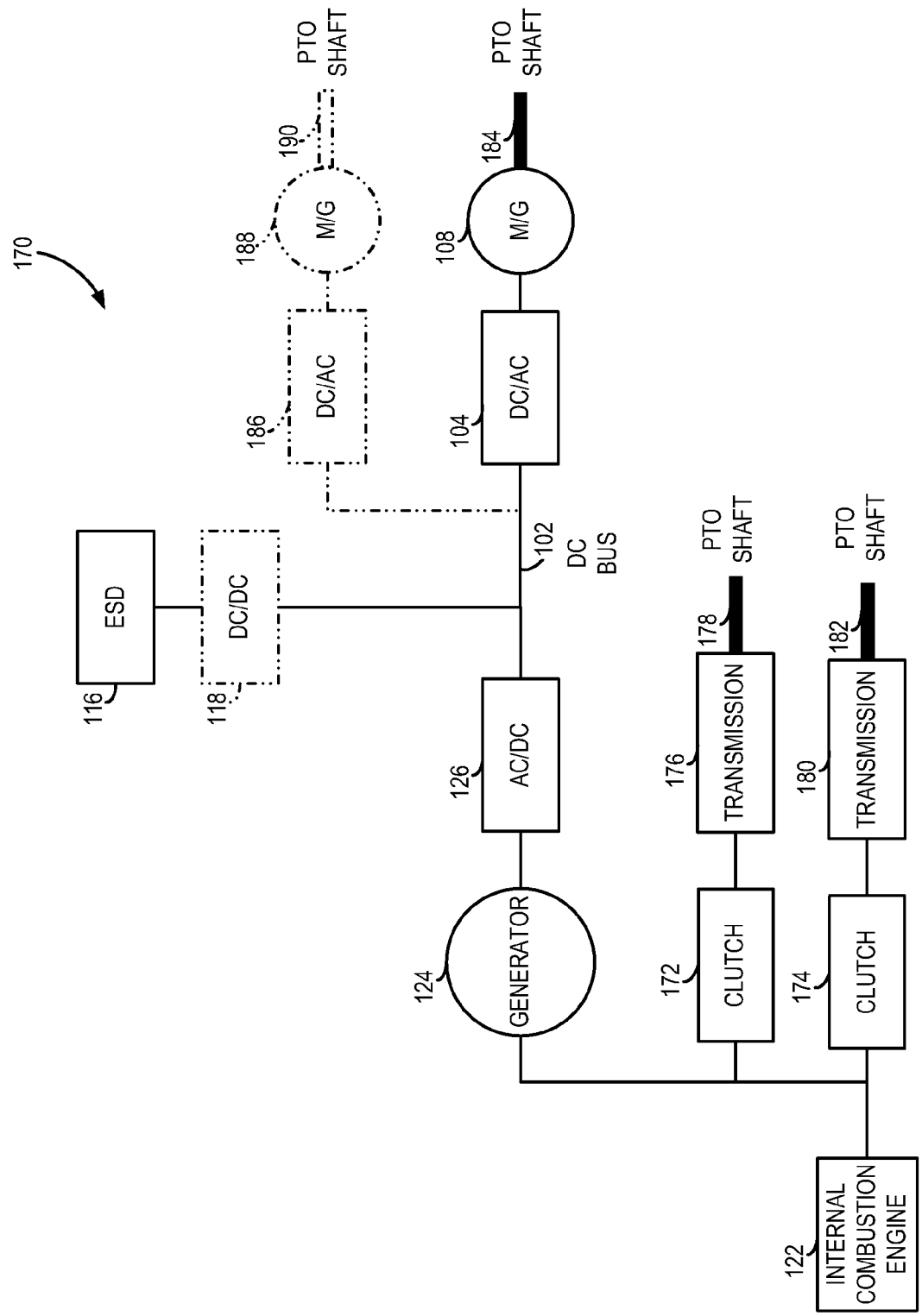
FIG. 7 is a block diagram of a retrofit hybrid power take-off system according to an embodiment of the invention.

FIG. 7 illustrates an embodiment of the invention used to retrofit a conventional combustion engine vehicle. Hybrid PTO system 170 includes internal combustion engine 122 coupled to first clutch 172 and second clutch 174. First clutch 172 is coupled to first transmission 176 which is coupled to first PTO shaft 178. Second clutch 174 is coupled to second transmission 180 which is coupled to drive shaft 182. A PTO device, similar to device 100 shown in FIG. 1, can be retrofitted to a conventional vehicle, by coupling electric generator 124 to combustion engine 122. AC-to-DC converter 126 is coupled to electric generator 124 and to DC bus 102. Energy storage device 116 is coupled to DC-to-DC voltage converter 118 (shown in phantom) which is, in turn, coupled to DC bus 102. Alternatively, it is also recognized that energy storage device 116 could be directly coupled to the DC bus 102, without inclusion of DC-to-DC voltage converter 118. Inverter 104 is coupled between DC bus 102 and an electrical drive system 108. Electrical drive system 108 is coupled to second PTO shaft 184. In an alternate embodiment of the invention, a second inverter 186 (shown in phantom) is coupled between DC bus 102 and an electrical drive system 188. Electrical drive system 188 (shown in phantom) is coupled to PTO shaft 190 (shown in phantom).

In operation, PTO shaft 178 and drive shaft 182 are driven by internal combustion engine 122 through clutches 172, 174 and transmissions 178, 182, respectively. This arrangement is consistent with that used in conventional combustion engine vehicles. The retrofitted PTO device is configured to drive a second PTO shaft 184, and, in an alternate embodiment, a third PTO shaft 190. Energy storage device 116 supplies a DC voltage which may be boosted to a higher DC voltage by DC-to-DC voltage converter 118 (shown in phantom) whose output is supplied to DC bus 102. Additional electric power may be supplied to DC bus 102 by electric generator 124 which is driven by combustion engine 122. AC-to-DC converter 126 converts the AC signal from electric generator 124 into a DC signal that is output to DC bus 102. Inverter 104 converts the DC signal on DC bus 102 into an AC signal suitable for driving electrical drive system 108 which then supplies the mechanical energy/power to rotate second PTO shaft 184 to produce a mechanical output for running an external device (not shown). In an alternate embodiment, second inverter 186 converts the DC signal on DC bus 102 into an AC signal suitable for driving electrical drive system 188, which supplies the mechanical power to rotate third PTO shaft 190.

Hybrid PTO system 170 may be employed when PTO shaft 178 is configured to drive relatively large loads, for example loads requiring 50 kW. However, second PTO shaft 184 and third PTO shaft 190 may be configured to drive loads requiring, for example, 5 kW and which can be efficiently operated from power supplied by energy storage device 116 and electric generator 124. Thus, the hybrid PTO system 170 provides for the operation of PTO shafts 178, 184 at different speeds/torques to power different external loads.

According to one embodiment of the invention, a power take-off (PTO) system includes an energy storage device configured to supply electrical power and at least one electrical drive system electrically connected to the energy storage device to receive the electrical power, with each of the at least one electrical drive systems configured to convert the electrical power to a desired mechanical power. The PTO system also includes at least one PTO shaft mechanically connected to each of the at least one electrical drive systems that is driven by the mechanical power to generate a mechanical output, with the mechanical output of each of the at least one PTO shafts being independently controllable from the mechanical output of other PTO shafts.

In accordance with another embodiment of the invention, a vehicle-based power take-off (PTO) device includes a DC bus, an energy storage unit connected to the DC bus and configured to supply DC power thereto, and a DC-to-AC converter connected to the DC bus and configured to invert the DC power to a controlled AC power. The vehicle-based PTO device also includes an electrical drive system electrically coupled to the DC-to-AC converter to receive the controlled AC power and convert the controlled AC power into a mechanical power and a PTO shaft mechanically coupled to the electrical drive system and driven by the controlled mechanical power.

In accordance with yet another embodiment of the invention, a method for manufacturing a power take-off (PTO) system includes the steps of providing a power system to supply a DC power, providing a DC bus coupled to the power system and configured to distribute the DC power, and electrically coupling at least one DC-to-AC converter to the DC bus to receive the DC power and invert the DC power to a controlled AC power. The method also includes the steps of electrically coupling at least one electrical drive system to each of the at least one DC-to-AC converters to generate a mechanical power from the controlled AC power and mechanically coupling a power take-off (PTO) shaft to each of the electrical drive systems such that each PTO shaft is driven by the mechanical power of its associated electrical drive system to produce a PTO shaft mechanical output.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle-based power take-off (PTO) system comprising:
    an energy storage device configured to supply electrical power;
    at least one electrical drive system electrically connected to the energy storage device to receive the electrical power, each of the at least one electrical drive systems configured to convert the electrical power to a desired mechanical power;
    a distribution bus having at least one distribution branch to electrically connect the energy storage device to a respective electrical drive system and distribute the electrical power thereto;
    an inverter coupled to each distribution branch in the distribution bus, the inverter configured to convert a DC power from the distribution bus into a conditioned AC power for driving a respective electrical drive system; and
    a PTO shaft mechanically connected to each of the at least one electrical drive systems and driven by the mechanical power to generate a mechanical output, the mechanical output of each PTO shaft being independently controllable;
    wherein each of the at least one electrical drive systems comprises an electric motor/generator combination configured to controllably drive a respective PTO shaft and to capture and convert mechanical energy from the PTO shaft into an AC power; and
    wherein the electrical power corresponding to the AC power generated by the electric motor/generator combination resulting from the capture and conversion of mechanical power from a respective PTO shaft is supplied directly to another electric motor/generator combination without first storing the energy in the energy storage device.

2. The vehicle-based PTO system of claim 1 further comprising:
    an internal combustion engine;
    a generator coupled to the internal combustion engine and configured to generate an AC power based on running of the engine; and
    a first AC-to-DC converter configured to convert the AC power into a DC power supplied to the distribution bus.

3. The vehicle-based PTO system of claim 2 further comprising an electrical power receptacle connected to receive the AC power from the generator, the electrical power receptacle configured to connect to an external load to supply the AC power thereto.

4. The vehicle-based PTO system of claim 1 further comprising:
    a plug connectable to an external power grid or an external generator to receive AC power; and
    a second AC-to-DC converter to receive the AC power from the external power grid or an external generator and convert the AC power into a DC power supplied to the distribution bus.

5. The vehicle-based PTO system of claim 1 wherein the inverter comprises a controller configured to:
    receive a power request from the respective electrical drive system to drive the associated PTO shaft; and
    control the amount of conditioned AC power transmitted to the respective electrical drive system based on the power request.

6. The vehicle-based PTO system of claim 5 wherein the controller is further configured to shut off power to its respective electrical drive system upon detection of a fault condition, thereby terminating the supply of mechanical power to the respective PTO shaft.

7. The vehicle-based PTO system of claim 1 wherein the inverter comprises a controller configured to:
    receive a rotational speed and rotational direction request from the respective electrical drive system to drive the associated PTO shaft; and
    control the amount of conditioned AC power and frequency transmitted to the respective electrical drive system based on the rotational speed and direction request.

8. The vehicle-based PTO system of claim 1 further comprising an electrical power receptacle positioned between the inverter and the respective electrical drive system to receive the conditioned AC power from the inverter, the electrical power receptacle configured to connect to an external load to supply the AC power thereto.

9. The vehicle-based PTO system of claim 1 wherein the respective electrical drive system comprises a pair of electrical drive systems connected to the inverter to receive the conditioned AC power therefrom.

10. The vehicle-based PTO system of claim 1 further comprising a bi-directional buck/boost converter coupled between the energy storage device and the distribution bus to supply controlled DC power to and from the energy storage device.

11. The vehicle-based PTO system of claim 1 wherein each respective electric motor/generator combination is configured to:
 capture mechanical energy from a respective PTO shaft during a shaft slowdown; and
 convert the captured mechanical energy into electrical energy.

12. The vehicle-based PTO system of claim 1 wherein each respective electric motor/generator combination is configured to:
 capture mechanical energy from a respective PTO shaft during maintaining a controlled rotational speed of a shaft during operation with an overhauling load; and
 convert the captured mechanical energy into electrical energy.

13. A vehicle-based power take-off (PTO) device comprising:
 a DC bus;
 an energy storage unit connected to the DC bus and configured to supply DC power thereto;
 a DC-to-AC converter connected to the DC bus and configured to invert the DC power to a controlled AC power;
 an electrical drive system electrically coupled to the DC-to-AC converter to receive the controlled AC power and convert the controlled AC power into a mechanical power; and
 a PTO shaft mechanically coupled to the electrical drive system and driven by the controlled mechanical power;
 wherein the electrical drive system comprises an electric motor/generator combination configured to controllably drive the PTO shaft and capture mechanical energy from the PTO shaft; and
 wherein the DC bus comprises a plurality of distribution branches each having a respective DC-to-AC converter, electrical drive system, and PTO shaft thereon, and wherein electrical power corresponding to the AC power generated by the electric motor/generator combination resulting from the capture and conversion of mechanical power from a respective PTO shaft is supplied directly to another electric motor/generator combination without first storing the energy in the energy storage unit.

14. The vehicle-based PTO device of claim 13 further comprising an auxiliary power unit (APU) configured to supply a supplemental DC power to the DC bus.

15. The vehicle-based PTO device of claim 14 wherein the APU comprises:
 an internal combustion engine configured to generate an engine output;
 a generator coupled to the internal combustion engine and configured to generate an AC power from the engine output; and
 an AC-to-DC converter coupled to the generator and the DC bus, the AC-to-DC converter configured to rectify the AC power into DC power supplied to the DC bus.

16. The vehicle-based PTO device of claim 15 further comprising an electrical power outlet connected to receive AC power from at least one of the generator and the DC-to-AC converter, the electrical power receptacle configured to connect with an external load to supply the AC power thereto.

17. The vehicle-based PTO device of claim 13 further comprising a controller configured to:
 sense one of a speed requirement and a torque requirement of the PTO shaft; and
 determine a frequency of the controlled AC power based on the sensed speed or torque of the PTO shaft.

18. The vehicle-based PTO device of claim 13 wherein the electric motor/generator is configured to:
 capture mechanical energy from the PTO shaft during operation at a decreased speed;
 convert the captured mechanical energy into an AC power; and
 transfer the AC power to the DC-to-AC converter, wherein the DC-to-AC converter is further configured to rectify the AC power to a DC power and distribution into the DC bus.

19. The vehicle-based PTO device of claim 13 wherein the electric motor/generator is configured to:
 capture mechanical energy from the PTO shaft during operation at a controlled rotational speed for overhauling load;
 convert the captured mechanical energy into an AC power; and
 transfer the AC power to the DC-to-AC converter, wherein the DC-to-AC converter is further configured to rectify the AC power to a DC power and distribution into the DC bus.

20. The vehicle-based PTO device of claim 13 further comprising a bi-directional DC-to-DC converter configured to boost the DC voltage of the power supplied by the energy storage unit and to condition the voltage of the recaptured DC power to recharge the energy storage unit.

21. A method for manufacturing a power take-off (PTO) system comprising:
 providing a power system to supply a DC power;
 providing a DC bus coupled to the power system and configured to distribute the DC power;
 electrically coupling at least one DC-to-AC converter to the DC bus to receive the DC power and invert the DC power to a controlled AC power;
 electrically coupling at least one electrical drive system to each of the at least one DC-to-AC converters to generate a mechanical power from the controlled AC power, each electrical drive system including an electric motor/generator combination; and
 mechanically coupling a power take-off (PTO) shaft to each of the electrical drive systems such that each PTO shaft is driven by the mechanical power of its associated electrical drive system to produce a PTO shaft mechanical output;
 wherein the electric motor/generator combination is configured to controllably drive the PTO shaft and capture mechanical energy from the PTO shaft for conversion to electrical power, with the electrical power resulting from the capture of the mechanical energy being supplied directly to another electric motor/generator combination of a respective electrical drive system without first storing the energy in the power system.

22. The method of claim 21 wherein providing the power supply comprises providing an energy storage unit electrically coupled to the DC bus to supply the DC power.

23. The method of claim 21 wherein providing the power supply comprises:
   providing an internal combustion engine configured to generate an engine output;
   coupling a generator to the internal combustion engine to generate an AC power from the engine output; and
   coupling an AC-to-DC converter to the generator to convert the AC power into DC power.

24. The method of claim 23 wherein mechanically coupling the PTO shaft comprises coupling each PTO shaft in the PTO system to its associated electrical drive system to produce a desired PTO shaft mechanical output rotational speed, rotational direction, and power that is independent of the engine output rotational speed, rotational direction, and power of the internal combustion engine.

25. The method of claim 23 further comprising providing an electrical power receptacle connected to one of the generator and the at least one DC-to-AC converter to receive the AC power therefrom and provide AC power to an external load.

26. The method of claim 21 further comprising providing a controller configured to:
   determine a rotational speed requirement or a torque requirement of the PTO shaft; and
   control the DC-to-AC converter to invert the DC power to the controlled AC power based on the determined rotational speed requirement or torque requirement of the PTO shaft, the controlled AC power having a controlled frequency for generating mechanical power in an associated electrical drive system to drive the PTO shaft at the required rotational speed, required rotational direction, or torque.

* * * * *